(12) United States Patent
Komatsuzaki (10) Patent No.: US 8,493,696 B2
(45) Date of Patent: Jul. 23, 2013

(54) UNINTERRUPTIBLE POWER SUPPLY AND METHOD FOR TRIPPING THEREOF

(75) Inventor: Yoshihiro Komatsuzaki, Tokyo (JP)

(73) Assignee: Fuji Electric Systems Co., Ltd., Tokyo (JP)

( * ) Notice: Subject to any disclaimer, the term of this patent is extended or adjusted under 35 U.S.C. 154(b) by 944 days.

(21) Appl. No.: 12/588,625

(22) Filed: Oct. 22, 2009

(65) Prior Publication Data

US 2010/0103711 A1  Apr. 29, 2010

(30) Foreign Application Priority Data

Oct. 23, 2008 (JP) ................................ 2008-273607

(51) Int. Cl.
*H02H 7/00* (2006.01)

(52) U.S. Cl.
USPC ............................................................ 361/18

(58) Field of Classification Search
USPC .............................................. 307/64; 361/18
See application file for complete search history.

(56) References Cited

U.S. PATENT DOCUMENTS

| | | | |
|---|---|---|---|
| 5,135,725 A * | 8/1992 | Hendrickson et al. ... | 422/186.15 |
| 5,745,355 A | 4/1998 | Tracy et al. | |
| 7,019,989 B2 * | 3/2006 | Kobayashi et al. ............ | 363/37 |
| 7,733,616 B2 * | 6/2010 | Yamada ............................ | 361/31 |
| 7,821,234 B2 * | 10/2010 | Moriya ........................... | 320/134 |
| 8,330,295 B2 * | 12/2012 | Komatsuzaki ................... | 307/64 |
| 2003/0012038 A1 * | 1/2003 | Welches et al. ................ | 363/34 |
| 2007/0133241 A1 * | 6/2007 | Mumtaz et al. ............... | 363/131 |

FOREIGN PATENT DOCUMENTS

| JP | H03-015235 A | 1/1991 |
|---|---|---|
| JP | A-2006-109603 | 4/2006 |

OTHER PUBLICATIONS

Office Action dated Feb. 23, 2012 in corresponding CN Application No. 200910207719.1.
Xiong et al. "Research on the Control Strategy for UPS with Inductor-current Feedback Loop." *Power Electronics* 37.4 (Jun. 2003): 25-27. (with Chinese Examiner's comments).
Office Action dated Jan. 8, 2013 issued by the Japan Patent Office in the corresponding Japan Patent Application No. 2008-273607 (and English translation of the Japanese Examiner's Comments attached).

* cited by examiner

*Primary Examiner* — Ronald E Leja
(74) *Attorney, Agent, or Firm* — Posz Law Group, PLC (57) ABSTRACT

Performance failure in an uninterruptible power supply (UPS) is determined independently by itself. A selective tripping can be done within a shorter time than one cycle of an AC output. A UPS converts a DC voltage to an AC voltage and supplies the AC voltage to a load device. A UPS has a control unit conducting a failure determination by using an instantaneous value of an internal voltage and current. It is preferred that a UPS includes an inverter unit and a trip switch. The inverter unit includes a semiconductor bridge circuit generating a sinusoidal AC voltage by modulating a DC voltage with voltage instruction values, and a filter circuit inserted between the semiconductor bridge circuit and the load device. The trip switch connects and trips a connection between the inverter unit and the load device according to the failure determination of the control unit.

8 Claims, 8 Drawing Sheets

Prior Art

Fig.8

UNINTERRUPTIBLE POWER SUPPLY AND METHOD FOR TRIPPING THEREOF

CROSS-REFERENCE TO RELATED APPLICATION

The present application is related to, claims priority from, and incorporates by reference Japanese Patent Application No. 2008-273607, filed on Oct. 23, 2008. This application is also related to U.S. application Ser. No. 12/588,626, entitled "UNINTERRUPTIBLE POWER SUPPLY AND METHOD FOR SELECTIVE TRIPPING THEREOF," filed simultaneously on Oct. 22, 2009 with the present application.

TECHNICAL FIELD

The present application relates to an uninterruptible power supply (abbreviated as UPS hereafter) and a method for tripping an uninterruptible power supply.

RELATED ART

Figure 8:
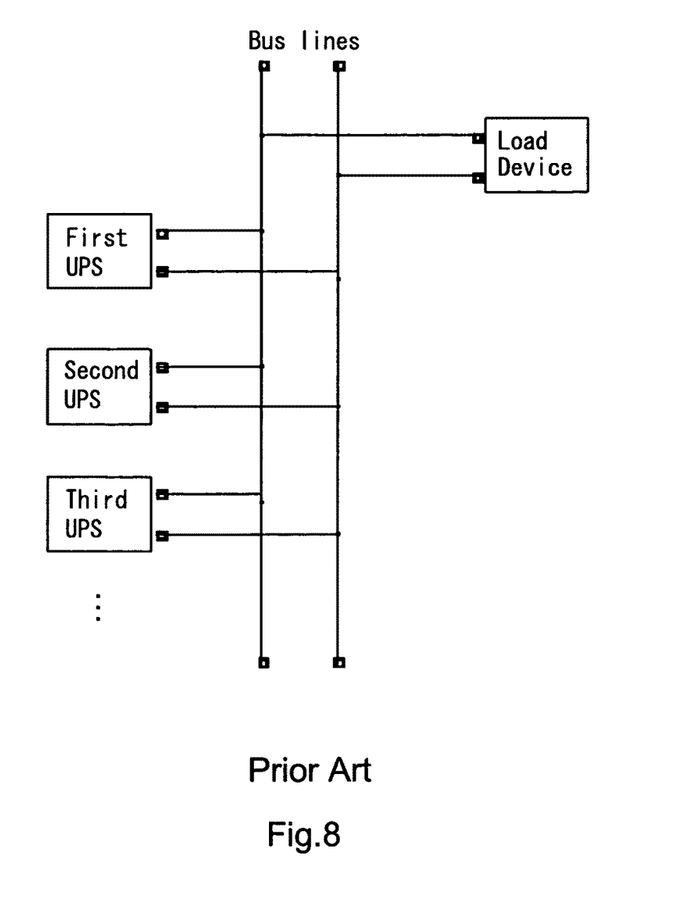
FIG. 8 is a schematic view of a UPS operating under a conventional parallel redundancy condition.

It is implemented that a backup power source device referred to as a UPS is provided in a power source system to minimize an influence of power source variation to a load device. Especially, in a power source system requiring high stability, plural UPSs (a first UPS, a second UPS, a third UPS . . . ) are operated in a parallel redundancy condition as shown in FIG. 8 to allow the power source system having enough power source capacity compared to the capacity of a load device.

However, in a power source system in which plural UPSs are operated in a parallel redundancy condition, when a UPS breaks down or fails (hereinafter fails), its breakdown, fault, or failure (hereinafter failure) influence affects plural other "good" UPSs through bus lines. As a result, the plural other "good" UPSs may also nm down or stop as a chain reaction. Since failure of a UPS affects an entire power source system, there is a possibility that a load device may run down or stop as well even though the power source system has enough power source capacity. In order to prevent the above described problems, a technology, a "selective tripping," is proposed. The selective tripping means that a failed UPS is selectively removed (tripped) from a power source system, and other "good" UPSs keep operating in a parallel redundancy condition.

It is desirable that each UPS connecting to a power source system in parallel detects that its own performance is indicative of failure and removes itself from the power source system for conducting a selective tripping. In other words, each UPS determines failure of its own performance based on its own internal information without sharing common power source and current information with other UPSs and removes itself from a power source system in case of its own failure. The following related art with respect to the expectation described above is known.

Related Art 1

U.S. Pat. No. 5,745,355A (W009750169A1, JP2000-513472A) discloses that each UPS detects its own output voltage $v0(t)$ and an inductor current is(t), which is a current flowing through an inductor inserted in a main circuit in series, and generates a one cycle-delay voltage $v0(t-T0)$, which is a voltage after one cycle from the output voltage $v0(t)$, and a one cycle-delay inductor current is(t−T0), which is an inductor current after one cycle from the inductor current is(t). Each UPS determines its own failure by multiplying differences between the detected output voltage $v0(t)$ and the generated one cycle-delay output voltage $v0(t-T0)$, and the detected inductor current is(t) and the generated one cycle-delay inductor current is(t−T0), respectively, as shown in the following series of formulas:

$$\Delta v0(t) := v0(t) - v0(t-T0) \quad (1)$$

$$\Delta is(t) := is(t) - is(t-T0) \quad (2)$$

if $\Delta v0(t) \times \Delta is(t) >$ threshold value, then Fault=1, else
Fault=0 (3)

Namely, in formula (3), when a left term value exceeds a threshold value, a failure determination signal, called as a fault signal, is set as "1." When a left term value does not exceed a threshold value, a fault signal is set as "0."

When the fault signal is "0," each UPS determines that its own performance is in a "good" condition and keeps connecting to a power source system through turning on (closing) a trip switch inserted in a main circuit in series. On the other hand, when the fault signal is "1," each UPS determines that its own performance is in a "failure" condition and removes itself from the power source system through turning off (opening) the trip switch inserted in a main circuit in series. As a result, a selective tripping for UPSs operated in a parallel redundancy condition is realized.

Related Art 2

JP2006-109603A (related art 2) discloses that an output voltage (bridge voltage) vi(t) of a semiconductor bridge configured for an inverter circuit of its own UPS instead of an inductor current is(t) described above and the same type of formulas for determination are used to provide a selective tripping of a UPS operated in a parallel redundancy condition. Specifically, each UPS determines its own failure by multiplying one cycle difference $\Delta v0(t)$ of the UPS output voltage $v0(t)$ and one cycle difference $\Delta vi(t)$ of the bridge voltage vi(t) as shown in the following series of formulas:

$$\Delta v0(t) := v0(t) - v0(t-T0) \quad (4)$$

$$\Delta vi(t) := vi(t) - vi(t-T0) \quad (5)$$

if $\Delta v0(t) \times \Delta vi(t) >$ threshold value, then Fault=1, else
Fault=0 (6)

Namely, in formula (6), when a left term value exceeds a threshold value, a fault signal is set as "1." When a left term value does not exceed a threshold value, a fault signal is set as "0." Note that when a bridge voltage $\Delta vi(t)$ is used, it is necessary that a carrier is attenuated by passing through a low-pass filter.

When the fault signal is "0," each UPS determines that its own performance is in a "good" condition and keeps connecting to a power source system through turning on (closing) a trip switch inserted in a main circuit in series. On the other hand, when the fault signal is "1," each UPS determines that its own performance is in a "failure" condition and removes it from the power source system through turning off (opening) the trip switch inserted in a main circuit in series. As a result, a selective tripping for UPSs operated in a parallel redundancy condition is realized.

A failed UPS must be immediately removed (tripped) from a power source system to minimize influence to other "good" UPSs and a load device. Therefore, it is preferable that a time for determining performance failure by each UPS is as short as possible. However, in the above related art 1 and 2, even though UPSs are able to determine their own failure through their internal information independently, they require use of a one cycle-delay signal of an output voltage, and so on for determining their own failure. Since these related art references determine whether or not a UPS keeps operating in a good condition by comparing an internal signal at a certain time with a signal after one cycle from the internal signal, they need one cycle time (1/50 [sec] or 1/60 [sec]) of a basic frequency of an alternating-current (AC) output to determine their own failure. Therefore, these related art references, which use a one cycle-delay signal, have a problem in which they cannot shorten a time required for a selective tripping of a UPS less than one cycle time.

SUMMARY

The present application is provided on the basis of the above situation. An object of the present application is to provide an uninterruptible power supply and a method for tripping an uninterruptible power supply that determine UPS performance failure independently and selectively trip within a time shorter than one cycle time (1/50 [sec] or 1/60 [sec]) of a basic frequency of an alternating-current (AC) output.

In order to solve the problems mentioned above, a UPS according to the present application that converts a DC voltage to an AC voltage and that supplies the AC voltage to a load device, and the UPS includes a control unit configured to perform a failure determination based on an instantaneous value provided by an internal voltage and current.

It is preferred that a UPS according to the present application has an inverter unit that includes a semiconductor bridge circuit for generating a sinusoidal AC voltage by modulating the DC voltage with voltage instruction values and, and a filter circuit inserted between the semiconductor bridge circuit and a load device in series. The UPS also has a trip switch for connecting and tripping the inverter unit to and from the load device with respect to the failure determination of the control unit.

It is preferred that the control unit generates a failure determination signal based on a deviation between an inductor current flowing through an inductor in the filter circuit and a simulated value as an estimated value of the inductor current generated by using a circuit constant of the inverter unit.

It is preferred that the control unit generates the simulated value of the inductor current based on a deviation between an output voltage of the inverter unit and the product of an instantaneous value of the DC voltage and an instantaneous value of the voltage instruction values.

It is preferred that the control unit includes an internal resistance estimation unit configured to estimate an internal resistance of the inverter unit, and the control unit generates the simulated value of the inductor current based on the estimated internal resistance.

A method for tripping an interruptible power supply according to the present application converts a DC voltage to an AC voltage and supplies the AC voltage to a load device. The method for tripping an interruptible power supply generate a signal indicating an occurrence of failure based on a deviation between an inductor current flowing through a filter inductor inserted in an inverter unit in series that modulates the DC voltage and generates the AC voltage, and an estimated value of the inductor current calculated by using a circuit constant of the inverter circuit, and performs to open a trip switch located between the inverter unit and the load device based on the signal.

It is preferred that the signal indicating an occurrence of failure is generated when a difference between the inductor current and the estimated value of the inductor current exceeds a certain value.

In an uninterruptible power supply (UPS) and a method for tripping an uninterruptible power supply according to the present application, since only an internal voltage and current are used for determining UPS performance failure, the determination of failure can be done independently. In addition to that, since an instantaneous value of an internal voltage and so on is used for determining UPS performance failure, a selective tripping is done within a fairly shorter time than one cycle time of a basic frequency of an alternating-current (AC) output.

BRIEF DESCRIPTION OF THE DRAWINGS

Specific embodiments of the present application will now be described, by way of an example only, with reference to the accompanying drawings in which.

DETAILED DESCRIPTION

A preferred embodiment of an uninterruptible power supply (UPS) according to the present application is explained with reference to the appended figures. A structure for one phase of one UPS is explained below. However, there is no limit to the number of UPSs according to one embodiment that could be operated in a parallel condition. A UPS according to one embodiment can be applied to a single phase power source system and a three-phase (multi-phase) power source system.

Figure 1:
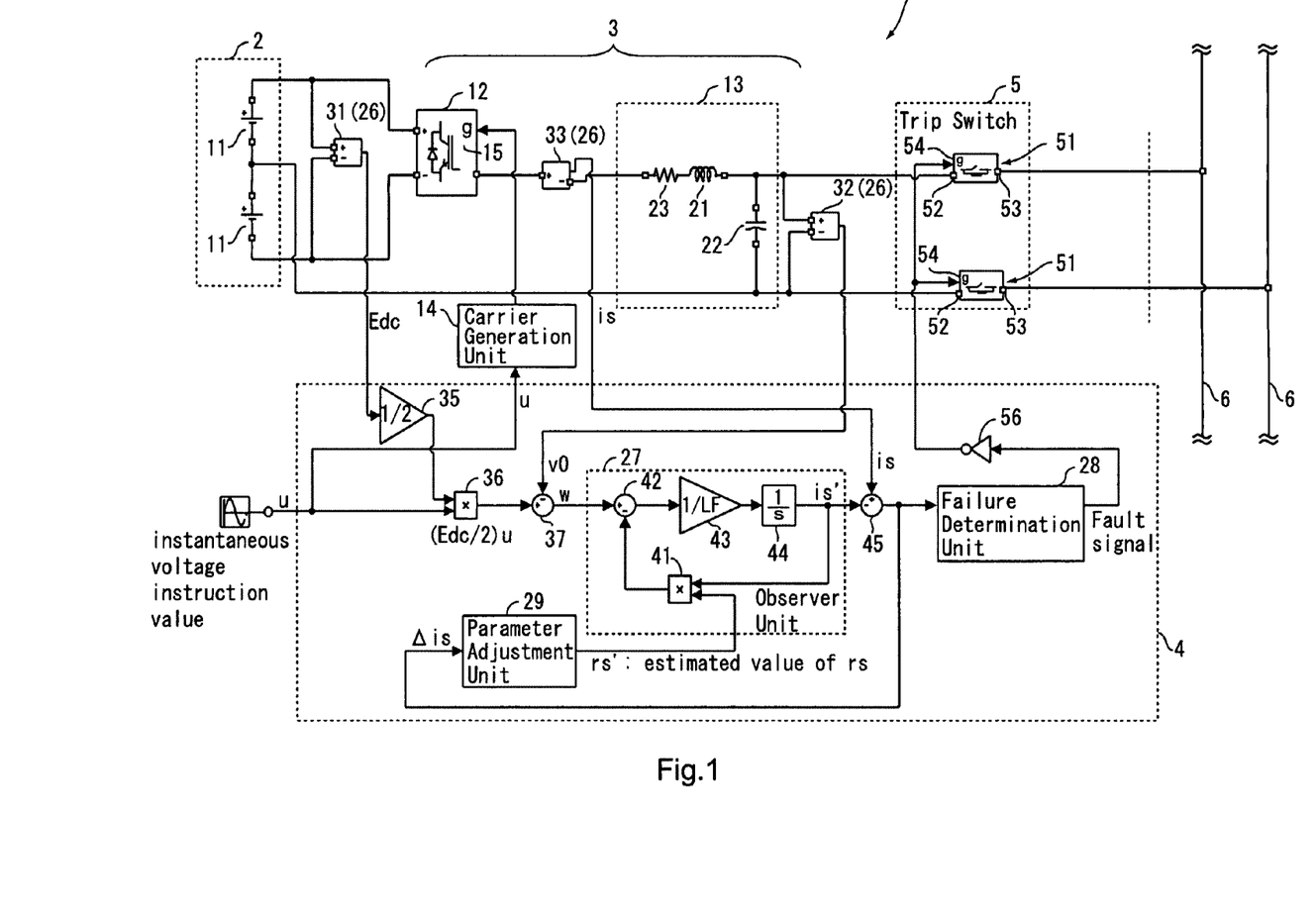
FIG. 1 is a block diagram of a main circuit structure of a UPS according to one embodiment of the present application.

FIG. 1 is a block diagram of a main circuit structure of an uninterruptible power supply (UPS) 1 according to one embodiment of the present application. A UPS 1 includes a direct-current (DC) power source unit 2, an inverter unit 3, a control unit 4, and a trip switch 5. The UPS 1 connects to other UPSs (not shown) and a load device (not shown) through bus lines 6 of a power source system.

The DC power source unit 2 supplies power for a load device when fluctuation of power occurs, such as an electric power outage or a voltage drop, with respect to a commercial power sources to which the DC power source unit 2 connects through the bus lines 6. For example, the DC power source unit 2 is configured with a secondary battery that is charged by a trickle charge when the UPS 1 does not function as a backup power source. The DC power source unit 2 is configured with two DC power source parts 11 symmetrically connected to a reference potential to obtain a sinusoidal AC voltage through the inverter unit 3.

The inverter unit 3 of the UPS 1 includes a semiconductor bridge circuit 12 and a filter circuit 13. The semiconductor bridge circuit 12 generates a sinusoidal AC voltage by turning on and off a DC link voltage Edc of the DC power source unit 2 at a certain time ratio. Specifically, the DC link voltage Edc is converted into an AC voltage that is synchronized with a series of instantaneous voltage instruction values u (sine wave with 50 Hz or 60 Hz) by a pulse width modulation (PWM) that varies a time ratio (duty ratio) of a carrier, which is generated by a carrier generation unit 14 and is inputted to a gate 15 of the semiconductor bridge circuit 13, with respect to the instantaneous voltage instruction value u. The semiconductor bridge circuit 12 is configured with a half-bridge circuit that uses, for example, a gate turn-off thyristor (GTO), an insulated gate bipolar transistor (IGBT), or a metal oxide silicon field effect transistor (MOSFET). A cycle length of a carrier outputted from the carrier generation unit 14 is required to be sufficiently small than a time constant of a circuit of the inverter unit 3, and therefore, it is, for example, a square wave with 20 kHz.

The filter circuit 13 is a filter that passes a frequency component (sine wave with 50 Hz or 60 Hz), which is supplied to a load device, among frequency components contained in a sinusoidal AC voltage outputted from the semiconductor bridge circuit 12 and that blocks a high-frequency component generated by the PWM in the semiconductor bridge circuit 12. The filter circuit 13 is provided in a main circuit located between the semiconductor bridge circuit 12 and the load device. The filter circuit 13 is configured with a filter inductor 21 provided in series in the main circuit and a filter capacitor 22 provided in parallel in the main circuit. An internal resistance 23 in the main circuit is discussed later.

A control unit 4 of the UPS 1 includes a measurement input unit 26 determining its own operation performance, an observer unit 27 generating a simulated value (simulated current) of an inductor current is, a failure determination unit 28 generating a fault signal as a failure determination signal after detecting UPS performance failure, and a parameter adjustment unit 29 as an internal resistance estimation unit estimating a value rs for an internal resistance 23 in the main circuit.

The measurement input unit 26 detects an instantaneous value of an internal voltage and current of the UPS 1. The measurement input unit 29 includes a DC link voltage detection unit 31 detecting a DC link voltage Edc(t) as an instantaneous value, an inverter voltage detection unit 32 detecting an inverter voltage (output voltage) v0(t) as an instantaneous value, and an inductor current detection unit 33 detecting an inductor current is(t) as an instantaneous value flowing through a filter inductor 21. A role of the inductor current detection unit 33 is discussed later. The DC link voltage Edc(t) detected by the DC link voltage detection unit 31 is multiplied by ½ at an amplifier 35, and then it is multiplied by an instantaneous voltage instruction value u(t) at a multiplier 36. A product, {Edc(t)/2}×u(t), obtained by the multiplier 36 is inputted to a subtracter 37. The subtracter 37 subtracts an inverter voltage v0(t) obtained by the inverter voltage detection unit 32 from the product, (Edc(t)/2)×u(t), obtained by the multiplier 36 and outputs a remainder (difference) as an instantaneous voltage deviation signal w(t). Therefore, the instantaneous voltage deviation signal w(t) is represented in a time domain as the following formula:

$$w(t)=\{Edc(t)/2\}\times u(t)-v0(t) \tag{7}$$

The observer unit 27 generates a simulated value (simulated current) is'(t) for an instantaneous value is(t) of the inductor current is flowing through the filter inductor 21 in the main circuit by using the instantaneous voltage deviation signal w(t) obtained through the subtracter 37 and an estimated value rs' for the internal resistance 23 obtained through the parameter adjustment unit 29. Specifically, at first, a multiplier 41 generates a product, (is'(t) rs'), through multiplying the simulated value is'(t), which is already obtained, for the instantaneous value is(t) of the inductor current is by the estimated value rs' for the internal resistance 23 outputted from the parameter adjustment unit 29. This product is inputted to a subtracter 42 and is subtracted it from the instantaneous voltage deviation signal w(t). Then, after an obtained remainder, {w(t)−(is'(t)·rs')}, is multiplied by 1/LF (LF is an inductance value of the filter inductor 21) through an amplifier 43, its product is integrated by an integrator 44 and is outputted as the simulated value is'(t) for the instantaneous value is(t) of the inductor current is. The simulated value is'(t) for the instantaneous value is(t) of the inductor current is outputted from the integrator 44 is sent to the subtracter 45 and inputted to the multiplier 41 again.

When a w(s) represents for an instantaneous voltage deviation signal w(t) that is transformed through Laplace transform, the simulated current is'(t) generated by the observer unit 27 is provided through the following formula (8):

$$is'(t)=L^{-1}[\{1/(rs+sLF)\}\times w(s)] \tag{8}$$

Here, an "s" represents for a Laplace operator. An $L^{-1}[\ ]$ means the inverse Laplace transform. A nominal value of the filter inductor 21 in the main circuit can be used as an inductance value LF because the inductance value LF of the filter inductor 21 is equal to the nominal value. The estimated value rs' estimated by the parameter adjustment unit 29 is used as the value rs of the internal resistance 23. A method for generating the estimated value rs' for the value rs of the internal resistance 23 in the main circuit through the parameter adjustment unit 29 is discussed later.

The failure determination unit 28 changes a value of the fault signal when the instantaneous value is(t) of the inductor current is detected by the inductor current detection unit 33 in the measurement input unit 26 is quite different from the simulated value is'(t) for the inductor current is generated by the observer unit 27. Specifically, a subtracter 45 subtracts the simulated value is'(t) for the inductor current is outputted from the observer unit 27 from the instantaneous value is(t) of the inductor current is obtained by the inductor current detection unit 33 and inputs its deviation Δis to the failure determination unit 28. Namely, the calculation is done in a time domain through the following formula:

$$\Delta is(t)=is(t)-is'(t) \tag{9}$$

Then the failure determination unit 28 determines whether its own performance of a UPS 1 is indicative of failure or not through a test described below.

In formula (10) below, when a left term value exceeds a threshold value, a value "1" is outputted as a fault signal. When a left term value does not exceed a threshold value, a value "0" is outputted as a fault signal.

$$\text{if } |\Delta is| > \text{threshold value, then Fault=1, else Fault=0} \tag{10}$$

Here, for example, the threshold value is about a half of the rated value. In other words, the failure determination unit 28 constantly compares the instantaneous value is(t) of the inductor current is with the simulated value (simulated current) is'(t) for the inductor current is. And then, when the difference of them is equal to or less than the threshold value, the failure determination unit 28 keeps a value "0" as the fault signal to be outputted. On the other hand, when its deviation (difference) between the instantaneous value is(t) and the simulated current is'(t) of the inductor current is is quite large and exceeds the threshold value, the failure determination unit 28 changes a value of the fault signal to be outputted to "1." This value "1" of the fault signal is a signal showing that failure is occurred. Alternatively, when "|Δis|" is equal to and over the threshold value (|Δis|≧threshold value), the fault signal "1" may be outputted, and when "|Δis|" is less than the threshold value (|Δis|<threshold value), the fault signal "0" may be outputted.

A trip switch 5 is configured with two switches 51 that have the same structure each other. Each switch 51 includes a connection part 52 connecting to a main circuit, a bus connection part 53 connecting to the bus lines 6, and a gate 54 inputting an on/off signal for each switch 51.

As discussed above, when the control unit 4 compares between the instantaneous value is(t) and the simulated current is'(t) of the inductor current is, and the deviation Δis of them exceeds a certain threshold value, the control unit 4 determines that its own performance of a UPS 1 is indicative of failure. A fault signal outputted from the failure determination unit 28 of the control unit 4 is inputted to the gate 54 of each switch 51 for the trip switch 5 that is inserted in series in the main circuit through an inverting amplifier (buffer) 56. An open-close function of the trip switch 5 is controlled by this fault signal. Namely, when an inputted value of a fault signal is "0," the trip switch 5 keeps its close position and maintains a connection state between bus lines 6 of a power source system and a UPS 1. On the other hand, when a value of the fault signal is changed to "1," each switch 51 of the trip switch 5 becomes its open position, trips the main circuit, and removes the UPS 1 from the bus lines 6 of the power source system.

Next, a method for estimating a value rs of an internal resistance 23 in a main circuit of a UPS 1 is explained below.

As discussed above, the UPS 1 has the parameter adjustment unit 29 in the control unit 4. The parameter adjustment unit 29 estimates the value rs of the internal resistance 23 in the main circuit by calculations. This is because it is difficult to measure the value rs of the internal resistance 23 in the main circuit during operations of the UPS 1. Therefore, in the parameter adjustment unit 29 of the UPS 1, the value rs in the main circuit is estimated by the following calculations. Namely, while a value rs that corresponds to the internal resistance 23 in the main circuit is sequentially changed (sweep) as shown in the lower part of FIG. 2, an effective value of a deviation Δis of the inductor current is is calculated as shown in the upper part of FIG. 2, and a set of data of a value of the internal resistance 23 and a value of the deviation Δis, which corresponds to the value of the internal resistance 23, is stored in a memory (not shown) at each time when they occur. And then, a value rs, which makes an effective value of the deviation Δis of the inductor current is minimum, is searched within sets of data stored in the memory, and the searched value rs is held.

Figure 2:
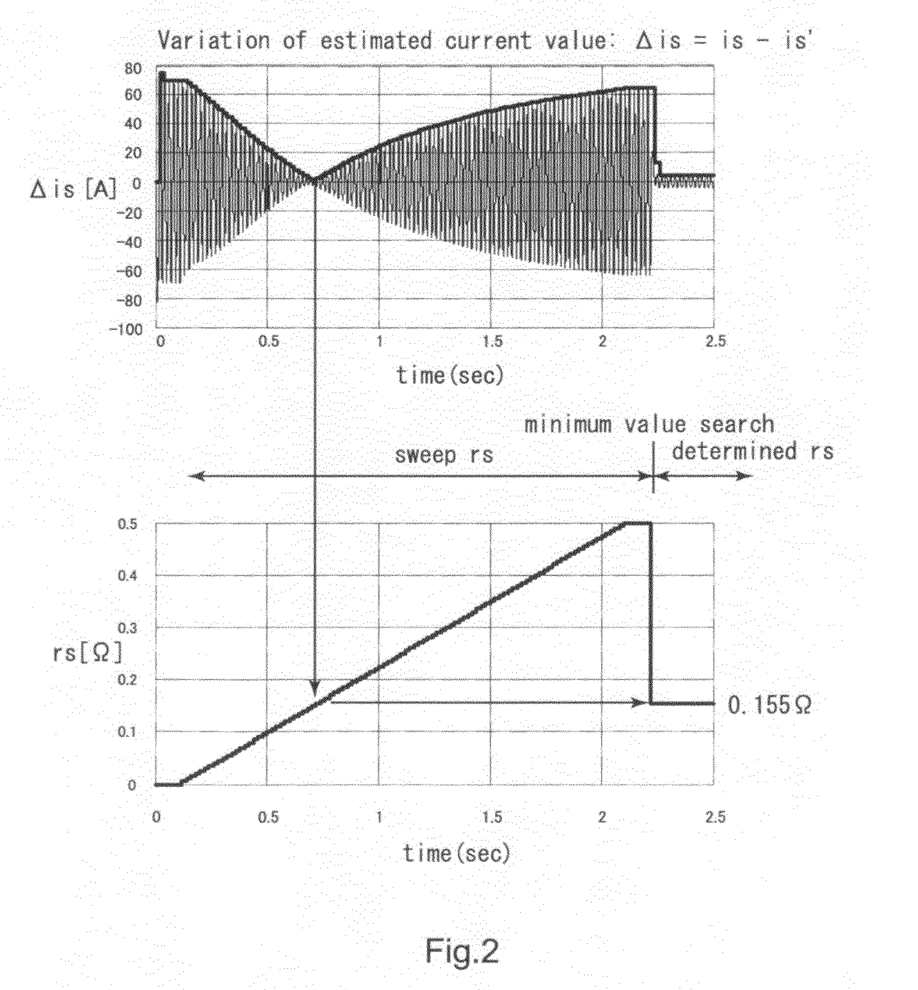
FIG. 2 is a view for explaining an operation of a parameter adjustment unit of a UPS according to one embodiment of the present application.

In an example of calculations shown in FIG. 2, a value rs of the internal resistance 23, which makes an effective value of the deviation Δis of the inductor current is minimum, is 0.155 [Ω]. Since an actual value of the internal resistance of the main circuit applied to the calculations is the set to 0.15 [Ω], estimation for the internal resistance by the method discussed above has an enough degree of accuracy. Therefore, the value rs of the internal resistance 23, which makes the effective value of the deviation Δis of the inductor current is minimum and is calculated by the parameter adjustment unit 29, is inputted to the observer unit 27 as an estimated value rs' of the internal resistance 23 in the main circuit and is used for the determination of failure. It is not necessary that the parameter adjustment unit 29 constantly conducts calculations discussed above. After the parameter adjustment unit 29 calculates an estimated value rs' of the internal resistance 23 through operating for a certain period of time and holds its value, the observer unit 27 may use the holding estimated value rs'. With respect to a range for change (sweep) of a value rs of the internal resistance, a range of 0% through 10% is applied as a percentage reading of impedance toward reference impedance of the main circuit. The range can be other ranges, such as 0% through 15% and 2% through 10%.

Figure 3:
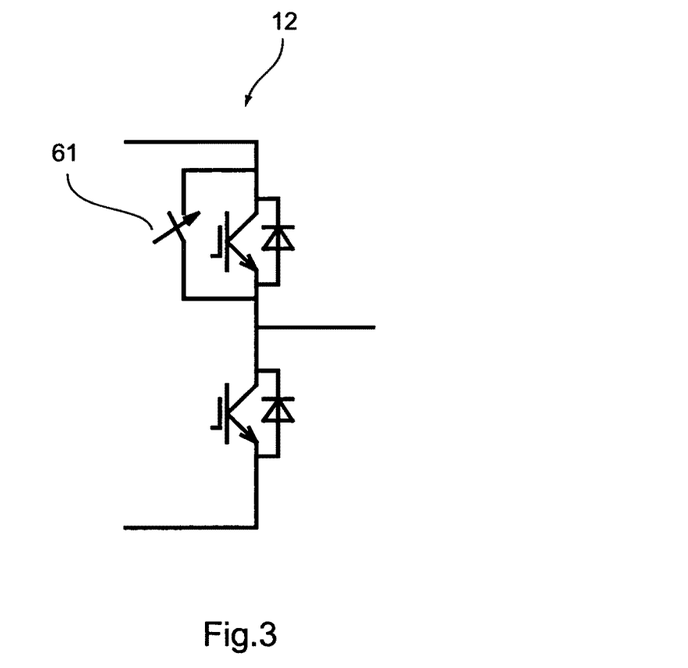
FIG. 3 is a schematic view of a short circuit switch simulating short circuit failure of a UPS according to one embodiment of the present application.

An operation of a UPS 1 according to one embodiment discussed above of the present application is explained with reference to simulation results. Simulations described below as an example assume that short circuit failure is sequentially occurred with respect to four UPSs 1 operating in a parallel redundancy condition. The short circuit failure of each UPS 1 is occurred by closing a short circuit switch 61 provided in parallel to an inverter as shown in FIG. 3. For example, one side (upper side, i.e., positive voltage side in FIG. 1) of a semiconductor bridge circuit 12 in an inverter unit 3 is simulatively shunted.

Main circuit parameters used for simulations are described below. Since a load device is a resistance load, the load capacity for one UPS 1 is 2.5 [kW]. The inverter unit 3 is configured with a single phase half bridge. A frequency of a carrier of the PWM is 20 [kHz]. A basic frequency of an AC output is 50 [Hz]. Voltages (DC link voltages) of a DC power source for each of UPSs are as follows; 408 [V] for a first UPS, 449 [V] for a second UPS, 471 [V] for a third UPS, and 460 [V] for a fourth UPS. Circuit constants for a filter circuit 13 inserted into the main circuit of a UPS 1 are as follows; LF=640 [µH] (inductance value LF of filter inductor 21), rs=0.15 [Ω] (value rs of internal resistance 23), and CF=20 [µF] (capacitance value CF of filter capacitor 22). These circuit constants are common among the first through the fourth UPSs. Note that an estimated value rs' calculated by the parameter adjustment unit 29 discussed above can be used as a value of the internal resistance 23.

Figure 4A:
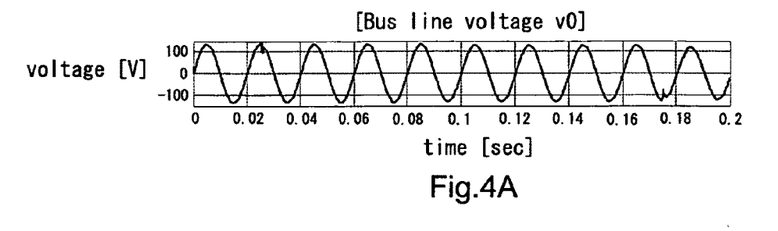
FIGS. 4A through 4E are views of simulation results of a selective tripping operation under a parallel redundancy condition of a UPS according to one embodiment of the present application.

FIGS. 4A through 4E show simulation results in which circuit parameters described above are used. FIG. 4A shows a bus line voltage v0 of bus lines 6 in a power source system to which four of UPSs 1 are connected in parallel. FIGS. 4B through 4E represent output currents i1, i2, i3, and i4 of the first UPS, second UPS, third UPS, and fourth UPS, of UPSs 1, respectively. In four UPSs 1 operating in a parallel redundancy condition, this simulation assumes the following short circuit failure cases: the first UPS is in short circuit failure after 0.025 [sec] from a reference time (0 [sec]); the second UPS is in short circuit failure after 0.09 [sec] from the reference time; and the third UPS is in short circuit failure after 0.175 [sec] from the reference time.

As shown in FIGS. 4A-4E, even though another UPS is in failure, each output current i1, i2, i3, and i4 of four UPSs 1 operating in a parallel redundancy condition is not changed; however, when its own UPS is in failure, the corresponding output current of the failed UPS immediately turns to 0 (zero). Even though each UPS 1 is tripped in the order of its occurrence of failure from the parallel redundancy operation, there is almost no change on a bus line voltage v0 because other "good" UPS(s) keep operating. By the results discussed above, it is understood that each UPS 1 operating in a parallel redundancy condition ensures a selective tripping operation.

Figure 4B:
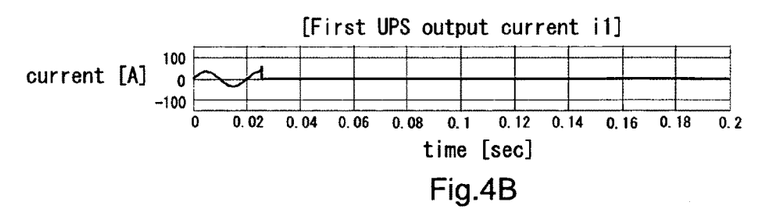
Figure 4C:
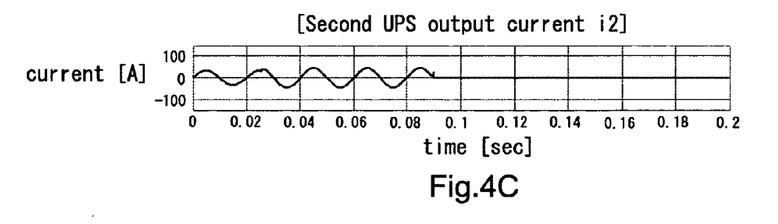
Figure 4D:
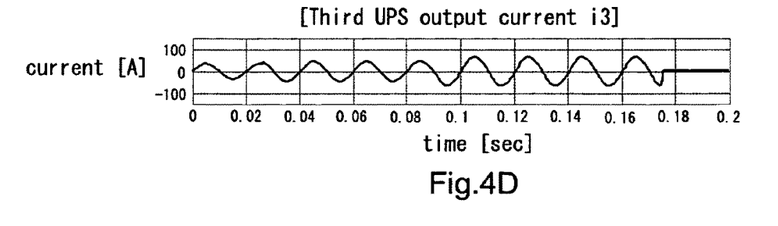
Figure 4E:
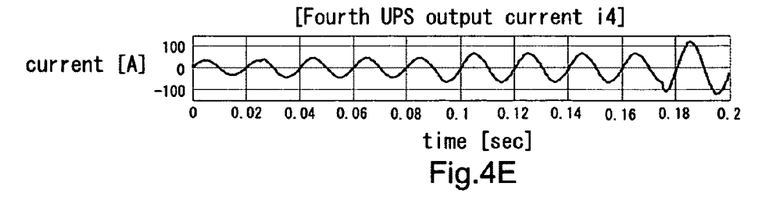
Figure 5A:
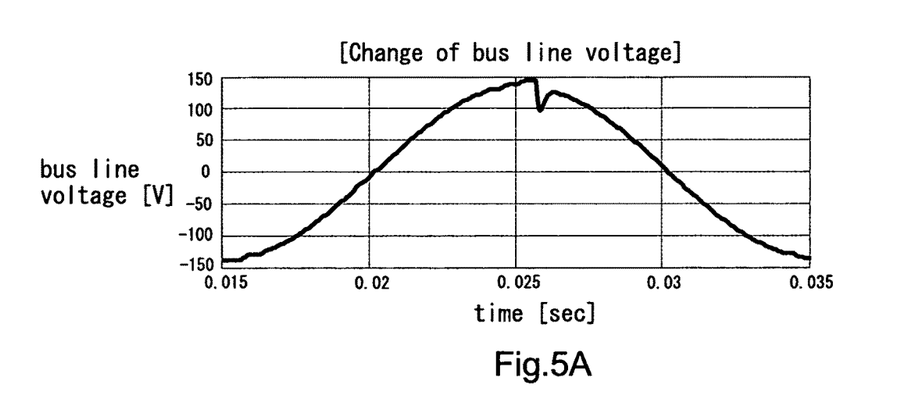
FIG. 5A is an enlarged view enlarging a part of a simulation result of FIG. 4A.
Figure 5B:
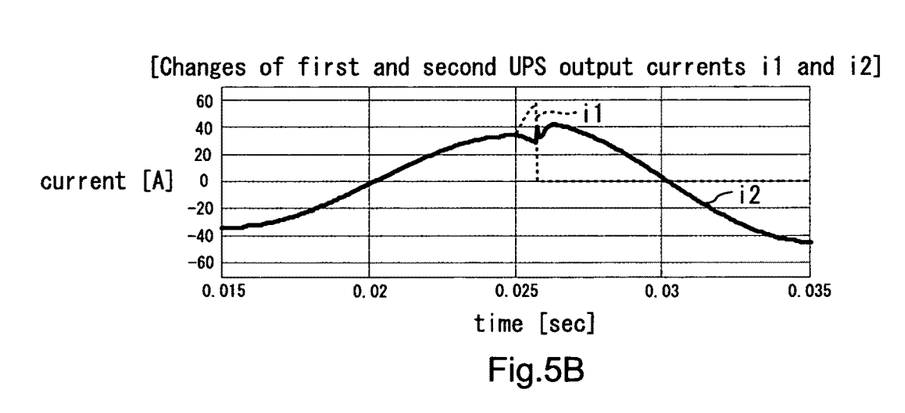
FIG. 5B is an enlarged view combining and enlarging a part of simulation results of FIG. 4B, according to one embodiment of the present application.

FIGS. 5A and 5B are enlarged views enlarging a part of a simulation result of FIGS. 4A-4C that relate to a bus line voltage v0, an output current i1 of the first UPS, and an output current i2 of the second UPS, respectively. When short circuit failure is occurred in the first UPS at a timing of 0.025 [sec], an output current i1 of the first UPS is temporarily increased, and then turned to 0 because of a selective tripping as shown in FIG. 5B. Even though the bus line voltage v0 is temporarily decreased as shown in FIG. 5A when the first UPS is selectively tripped from the operation in a parallel redundancy condition, there is almost no influence to the operation of the second UPS as a "good" UPS by its decrease. In this simulation, a time required from the occurrence of short circuit failure through the selective tripping is about 700 [μsec], i.e., about a 0.035 cycle. Since a basic frequency of an AC output is 50 [Hz], one cycle is equal to ⅟₅₀ [sec]. By the results discussed above, it is understood that the UPS 1 according to one embodiment of the present application completes its selective tripping within a fairly shorter time than one cycle time of a basic frequency of an AC output.

Figure 6A:
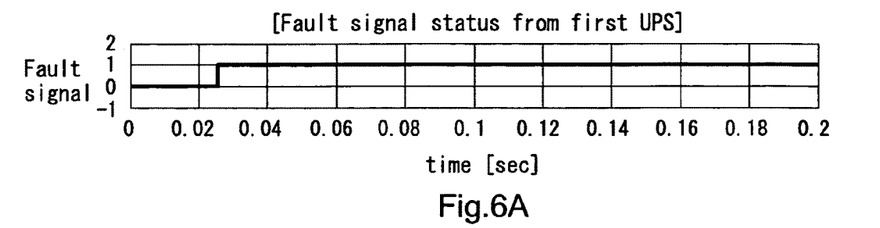
FIGS. 6A thorough 6D are views of simulation results of a fault signal of a UPS according to one embodiment of the present invention.
Figure 6B:
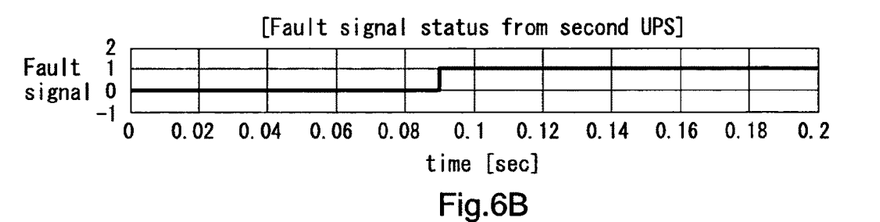
Figure 6C:
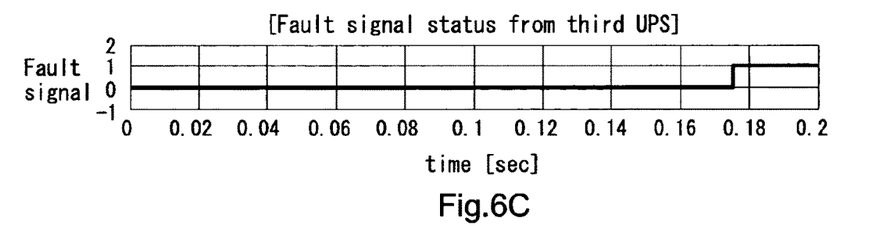
Figure 6D:
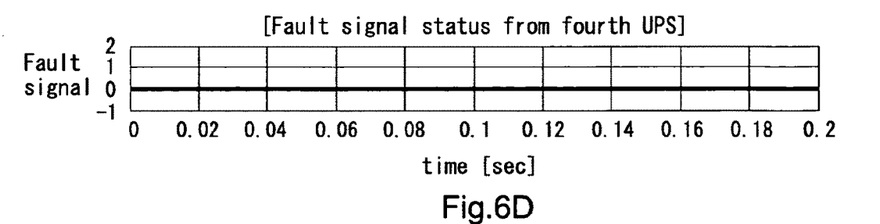

FIGS. 6A-6D show fault signals each of which is outputted from a failure determination unit 28 when short circuit failure is occurred in the respective UPS 1. A value of the fault signal for a first UPS shown in FIG. 6A is changed from "0" to "1" at the time of an occurrence of failure on the first UPS, 0.025 [sec]. A value of the fault signal for a second UPS shown in FIG. 6B is changed from "0" to "1" at the time of an occurrence of failure on the second UPS, 0.09 [sec]. A value of the fault signal for a third UPS shown in FIG. 6C is changed from "0" to "1" at the time of an occurrence of failure on the third UPS, 0.175 [sec]. A value of the fault signal for a fourth UPS, which is not in failure, shown in FIG. 6D remains the same value, "0." By the results discussed above, it is understood that each UPS 1 operating in a parallel redundancy condition ensures a failure determination operation.

Figure 7:
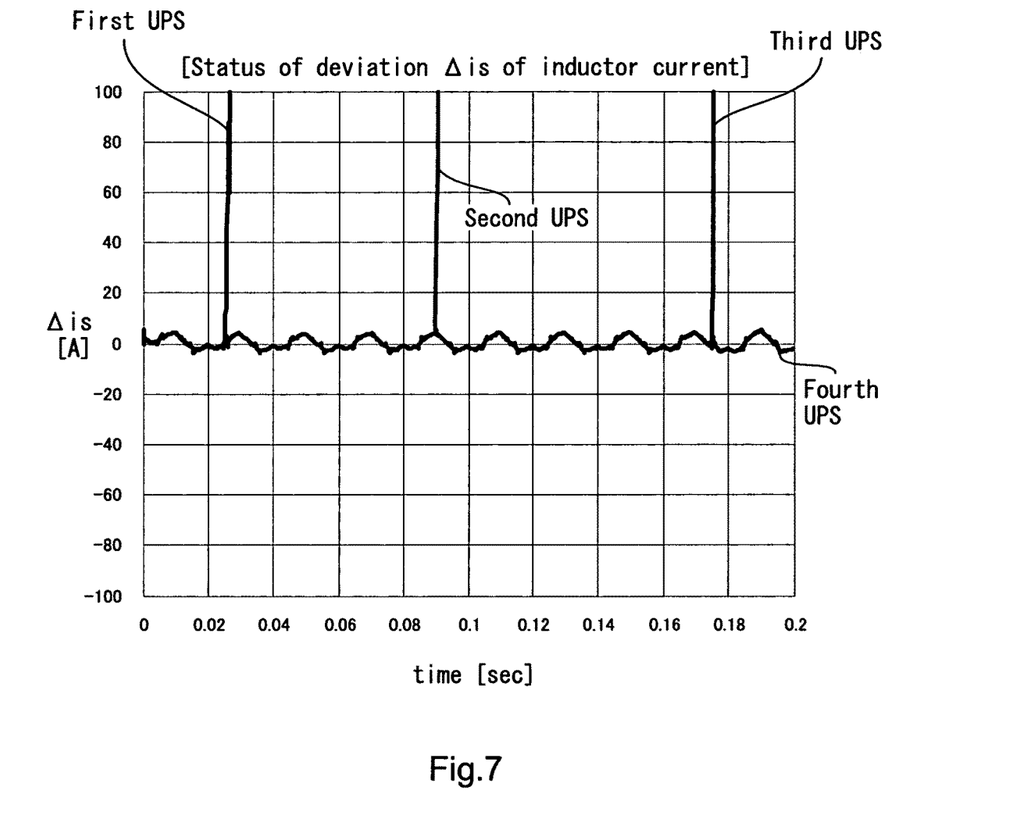
FIG. 7 is a view of a simulation result of a deviation (difference) of an inductor current of a UPS according to one embodiment of the present application.

FIG. 7 shows a simulation result of a deviation Δis(t) between an instantaneous value is(t) of an inductor current is and a simulated value (simulated current) is'(t) for the inductor current is. In each UPS 1 of the first through third UPSs, the deviation value Δis of the inductor current is, is significantly projected at the time of an occurrence of short circuit failure. By the results discussed above, it is understood that a failure determination operation is ensured by using the deviation Δis of the inductor current is. In FIG. 7, the deviation value Δis of the inductor current is is projected toward a positive voltage side. This is because short circuit failure is simulated by closing a short circuit switch 61 in the upper side of a semiconductor bridge circuit 12 shown in FIG. 3. Alternatively, when a short circuit switch 61 is provided in the lower side of FIG. 3, and a short circuit failure is simulated by closing this short circuit switch 61, the deviation value Δis is projected toward a negative voltage side. Of course, a UPS 1 can perform a failure determination by the either of the methods discussed above.

It is preferred that a circuit for a main part of a UPS 1 according to one embodiment of the present application is configured with a hardware (or a firmware) to obtain effects to the maximum extent possible, i.e., a failure determination and a selective tripping can be performed at a faster pace by utilizing an instantaneous value of its own internal signal of the UPS 1. Alternatively, it may be accomplished by software. So long as operations described in formulas (7)-(10) are realized, it does not matter about specific circuit structures. It can be decided in consideration with factors, such as a required time for operations, a degree of accuracy of operations, and ease of structures.

As explained above, a UPS 1 according to one embodiment of the present application can determine failure of its own performance with its own internal information, such as a DC link voltage Edc, an inverter voltage v0, and an inductor current is. Therefore, even though the UPS 1 operates along with other UPSs in a parallel operation condition, it is not necessary to use common information with other UPSs, and it is possible to determine UPS performance failure without influence from other UPSs. With respect to the UPS 1 according to one embodiment of the present application, since an instantaneous value of an internal voltage and current is used for determining UPS performance failure of the UPS 1, selective tripping can be done within a fairly shorter time than one cycle time of a basic frequency (50 Hz or 60 Hz) of an AC output. This method discussed above is different from a conventional UPS that determines failure with a one cycle-delay signal.

A UPS 1 according to one embodiment of the present application is explained above. However, it should be appreciated that a wide variety of alterations and modifications are possible as far as they do not depart from the spirit and scope of the attached claims. For example, in the explanation above, it is assumed that a UPS 1 according to one embodiment of the present application operates along with other UPSs in a parallel operation condition; however, it is a matter of course that a UPS 1 according to one embodiment of the present application can operate alone without any other UPS. A UPS 1 according to one embodiment of the present application can operate along with another UPS having a different size of power source capacity from the UPS 1 in a parallel operation condition. In that situation, since the determination of failure of its own performance of the UPS 1 can be done independently, a stable parallel operation is accomplished.

The UPS 1 discussed above includes a control unit 4 in which instantaneous values of an internal voltage and current are used for determining UPS performance failure. However, the control unit 4 determining failure may be provided outside UPS 1 rather than inside UPS 1. A failure determination is accomplished in generating a fault signal based on a simulated value is'(t) as an estimated value of an inductor current is generated by using a circuit constant of an inverter unit 3. However, a resistance value rs of an internal impedance (internal resistance 23) in a UPS 1 is identified with an instantaneous value of an internal voltage and current of the UPS 1, and then, a failure determination may be accomplished in detecting an abnormal fluctuation of the resistance value rs.

The UPS 1 has an inverter unit 3 that includes a semiconductor bridge circuit 12 for generating a sinusoidal AC voltage by modulating the DC voltage with voltage instruction values, and a filter circuit 13 inserted between the semiconductor bridge circuit 12 and the load device in series. The UPS 1 also has a trip switch 5 for connecting and tripping the inverter unit 3 to and from the load device with respect to the failure determination of the control unit. This trip switch 5 may be not only a mechanical switch being capable of a mechanical connecting and tripping, but also an electrical switch, such as a semiconductor switch being capable of an electrical connecting and tripping.

The control unit 4 of the UPS 1 generates a fault signal based on a deviation Δis(t) between an instantaneous value is(t) of an inductor current is flowing through a filter inductor 21 in the filter circuit 13 and a simulated value is'(t) as an estimated value of the inductor current is generated by using a circuit constant of the inverter unit 3. This fault signal has two kinds of signals, such as "0" and "1." However, three kinds of signals or other values can be used for the fault signal.

The control unit 4 generates the simulated value is'(t) of the inductor current is based on an instantaneous voltage deviation signal w(t) as a deviation between an output voltage of the inverter unit 3 and the product of an instantaneous value of the DC voltage and an instantaneous voltage instruction value u(t) as an instantaneous value u of the voltage instruction values. It is not necessary to use an instantaneous value in a strict sense as these instantaneous values. When an instantaneous value is within one cycle of an AC output, it can be used.

The control unit 4 includes the parameter adjustment unit 29 as an internal resistance estimation unit configured to estimate a value rs of an internal resistance of the inverter unit 3, and the control unit 4 generates the simulated value is' of the inductor current is based on the estimated value rs' of the internal resistance 23. This internal resistance estimation unit can be provided not only inside UPS 1, but also outside UPS 1.

What is claimed is:

1. An uninterruptible power supply that converts a DC voltage to an AC voltage and that supplies the AC voltage to a load device, comprising:
    a control unit configured to perform a failure determination based on an instantaneous value provided by an internal voltage and current;
    an inverter unit that includes a semiconductor bridge circuit for modulating the DC voltage based on a predetermined voltage value to generate a sinusoidal AC voltage, and a filter circuit inserted between the semiconductor bridge circuit and the load device in series; and
    a trip switch for connecting and tripping the inverter unit to and from the load device with respect to the failure determination of the control unit, wherein
    the control unit is further configured to generate a failure determination signal based on a deviation between an inductor current flowing through an inductor in the filter circuit and a simulated value as an estimated value of the inductor current generated by using a circuit constant of the inverter unit.

2. The uninterruptible power supply according to claim 1, wherein
    the control unit generates the simulated value of the inductor current based on a deviation between an output voltage of the inverter unit and the product of an instantaneous value of the DC voltage and an instantaneous value of the voltage instruction values.

3. The uninterruptible power supply according to claim 2, wherein
    the control unit includes an internal resistance estimation unit configured to estimate an internal resistance of the inverter unit, and
    the control unit generates the simulated value of the inductor current based on the estimated internal resistance.

4. A method for tripping an interruptible power supply that converts a DC voltage to an AC voltage and that supplies the AC voltage to a load device, comprising:
    generating a signal indicating an occurrence of failure based on a deviation between an inductor current flowing through a filter inductor inserted in an inverter unit in series that modulates the DC voltage and generates the AC voltage, and an estimated value of the inductor current calculated by using a circuit constant of the inverter circuit; and
    opening a trip switch located between the inverter unit and the load device based on the signal.

5. The trip method for an uninterruptible power supply according to claim 4, wherein the signal indicating an occurrence of failure is generated when a difference between the inductor current and the estimated value of the inductor current exceeds a certain value.

6. An uninterruptible power supply (UPS) comprising:
    a convertor configured to convert a DC voltage to an AC voltage;
    a supplier configured to receive the AC voltage from the convertor and supply the AC voltage to a load device;
    a detector configured to detect instantaneous values of an internal voltage and current;
    a control unit configured to determine whether the UPS's performance is indicative of failure based on the instantaneous values and generating a failure determination signal based on its failure determination;
    an inverter unit that includes the convertor and a filter circuit; and
    a trip switch for connecting and tripping the inverter unit to and from the load device with respect to the failure determination of the control unit, wherein
    the converter includes a semiconductor bridge circuit for generating a sinusoidal AC voltage by modulating the DC voltage with voltage instruction values,
    the filter circuit is inserted between the semiconductor bridge circuit and the load device in series, and
    the control unit is further configured to generate the failure determination signal based on a deviation between an inductor current flowing through an inductor in the filter circuit and a simulated value as an estimated value of the inductor current generated by using a circuit constant of the inverter unit.

7. The uninterruptible power supply according to claim 6, wherein
    the control unit generates the simulated value of the inductor current based on a deviation between an output voltage of the inverter unit and the product of an instantaneous value of the DC voltage and an instantaneous value of the voltage instruction values.

8. The uninterruptible power supply according to claim 7, wherein
    the control unit includes an internal resistance estimation unit configured to estimate an internal resistance of the inverter unit, and
    the control unit generates the simulated value of the inductor current based on the estimated internal resistance.

* * * * *